US011713255B2

United States Patent
Knopke et al.

(10) Patent No.: US 11,713,255 B2
(45) Date of Patent: *Aug. 1, 2023

(54) WATER FILTER CARTRIDGE

(71) Applicant: Aqua Clara International Incorporated, Holland, MI (US)

(72) Inventors: Harry Joseph Knopke, Grand Rapids, MI (US); Todd Alan Kercher, Holland, MI (US); Jon Harold Bechtel, Franklin, TN (US); Jay Everett VandenBrink, Holland, MI (US)

(73) Assignee: Aqua Chira International Incorporated, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,467

(22) Filed: Jul. 1, 2021

(65) Prior Publication Data

US 2021/0323839 A1      Oct. 21, 2021

Related U.S. Application Data

(63) Continuation-in-part of application No. 16/177,654, filed on Nov. 1, 2018, now Pat. No. 11,053,137.

(60) Provisional application No. 62/580,508, filed on Nov. 2, 2017.

(51) Int. Cl.
   *C02F 1/28*  (2023.01)
   *C02F 1/00*  (2023.01)

(52) U.S. Cl.
   CPC .............. *C02F 1/283* (2013.01); *C02F 1/003* (2013.01); *C02F 2201/006* (2013.01); *C02F 2307/04* (2013.01)

(58) Field of Classification Search
   CPC .... C02F 1/283; C02F 1/003; C02F 2201/006; C02F 2307/04; C02F 1/288; C02F 1/281; C02F 2101/20; C02F 2305/08
   USPC ....... 210/435, 446, 450, 456, 464, 465, 468, 210/470, 473, 282–284, 289–292
   See application file for complete search history.

(56) References Cited

U.S. PATENT DOCUMENTS

| | | |
|---|---|---|
| 2,723,761 A | 11/1955 | Made et al. |
| D188,688 S | 8/1960 | Sicard |
| 4,826,513 A | 5/1989 | Stackhouse et al. |
| D312,863 S | 12/1990 | Hankammer |
| 5,002,665 A | 3/1991 | Brueggemann |
| 5,205,932 A | 4/1993 | Solomon et al. |
| D380,535 S | 7/1997 | Joergensen |

(Continued)

FOREIGN PATENT DOCUMENTS

| | | |
|---|---|---|
| CN | 104817216 | 8/2015 |
| CN | 105903268 | 8/2016 |

(Continued)

*Primary Examiner* — Madeline Gonzalez
(74) *Attorney, Agent, or Firm* — Gardner, Linn, Burkhart & Ondersma LLP (57) ABSTRACT

A water filter cartridge is provided for gravity-feed water filtration applications, and includes a granular filter media made from a mixture of titanium dioxide particles interspersed with granular activated charcoal. The granular filter media is placed in a filter housing having an upper inlet opening and a lower outlet opening. A seal may be disposed around an outer periphery of the housing at its upper region, and may include a flange region that flexes upwardly upon insertion of the sidewall into a filter cartridge opening.

20 Claims, 6 Drawing Sheets

(56) References Cited

U.S. PATENT DOCUMENTS

| | | |
|---|---|---|
| D435,084 S | 12/2000 | Northen et al. |
| 6,197,193 B1 | 3/2001 | Archer |
| 6,238,552 B1 | 5/2001 | Shannon |
| 6,524,477 B1 | 2/2003 | Hughes |
| D487,914 S | 5/2004 | Schulze et al. |
| D565,149 S | 3/2008 | Slawomir |
| D565,694 S | 4/2008 | Slawomir |
| 7,455,769 B2 | 11/2008 | Heitele |
| 7,484,626 B2 | 2/2009 | Judkins |
| 7,497,952 B2 | 3/2009 | Meng et al. |
| 7,638,045 B2 | 12/2009 | Reid |
| 7,695,615 B2 * | 4/2010 | Vinogradova ........... C02F 1/003 210/120 |
| 7,722,766 B2 | 5/2010 | Namur |
| D642,657 S | 8/2011 | Cumberland et al. |
| D642,658 S | 8/2011 | Cumberland et al. |
| D643,090 S | 8/2011 | Cumberland et al. |
| 8,025,802 B2 | 9/2011 | Walde et al. |
| 8,034,155 B2 | 10/2011 | Chang et al. |
| 8,114,284 B2 | 2/2012 | Walde et al. |
| 8,153,002 B2 | 4/2012 | Namur |
| 8,158,084 B2 | 4/2012 | Rinker et al. |
| 8,167,141 B2 | 5/2012 | Knipmeyer et al. |
| 8,216,451 B2 | 7/2012 | Walde et al. |
| 8,298,408 B2 | 10/2012 | Moretto |
| 8,309,030 B2 | 11/2012 | Rinker et al. |
| 8,376,147 B2 | 2/2013 | Reder et al. |
| 8,388,841 B2 | 3/2013 | Moretto |
| 8,439,205 B1 | 5/2013 | Nohren, Jr. |
| D684,009 S | 6/2013 | Bell et al. |
| 8,470,176 B2 | 6/2013 | Deptala et al. |
| D686,692 S | 7/2013 | Schaub et al. |
| D686,693 S | 7/2013 | Schaub et al. |
| 8,614,425 B2 | 12/2013 | Conradt et al. |
| 8,986,544 B2 | 3/2015 | Bommi et al. |
| 9,023,205 B2 | 5/2015 | Namur |
| 9,045,353 B2 | 6/2015 | Parekh et al. |
| 9,120,684 B2 | 9/2015 | McDonald et al. |
| 9,227,367 B2 | 1/2016 | Festner et al. |
| D775,311 S | 12/2016 | Cooper et al. |
| D782,611 S | 3/2017 | Plihal |
| D790,659 S | 6/2017 | Rummel et al. |
| D792,941 S | 7/2017 | Rummel et al. |
| 11,053,137 B1 * | 7/2021 | Knopke ............. B01J 20/28016 |
| 2005/0077246 A1 * | 4/2005 | Pardini ................ C01B 25/372 210/724 |
| 2007/0235381 A1 | 10/2007 | Tsai |
| 2010/0006508 A1 | 1/2010 | Mitchell et al. |
| 2011/0311638 A1 | 12/2011 | Chang et al. |
| 2012/0055862 A1 * | 3/2012 | Parekh ..................... C02F 1/42 210/244 |
| 2012/0199468 A1 | 8/2012 | Cheng et al. |
| 2014/0263019 A1 | 9/2014 | Wu |
| 2016/0151724 A1 | 6/2016 | Jeong |
| 2016/0167980 A1 | 6/2016 | Dani et al. |
| 2016/0376161 A1 | 12/2016 | Dani et al. |
| 2016/0376162 A1 | 12/2016 | Dani et al. |
| 2017/0050127 A1 | 2/2017 | Dani et al. |
| 2018/0050945 A1 | 2/2018 | McDonald et al. |

FOREIGN PATENT DOCUMENTS

| | | |
|---|---|---|
| CN | 105923862 | 9/2016 |
| WO | 2012025943 | 3/2012 |
| WO | 2016153458 | 9/2016 |

* cited by examiner

WATER FILTER CARTRIDGE

CROSS REFERENCE TO RELATED APPLICATIONS

The present application is a continuation-in-part of U.S. patent application Ser. No. 16/177,654, filed Nov. 1, 2018, now U.S. Pat. No. 11,053,137, which claims the benefit of U.S. provisional application Ser. No. 62/580,508, filed Nov. 2, 2017, both of which are hereby incorporated herein by reference in their entireties.

FIELD OF THE INVENTION

The present invention relates to water filtration and, more particularly, to disposable water filter cartridges for drinking water.

BACKGROUND OF THE INVENTION

Water filter cartridges are commonly used in gravity-feed water filter pitchers, such as to reduce off-tastes, such as from chlorine, in source water from in municipal water supplies, well water, and other common drinking sources. While such drinking sources, particularly in developed countries, are generally safe from pathogens including bacteria, cysts, viruses, parasites, protozoa, and the like, these drinking sources may still contain unsafe levels of heavy metals, pesticides and carcinogenic matter entering the water from mining operations, waste dumps, farm fields, and even residential neighborhoods.

SUMMARY OF THE INVENTION

The present invention provides a water filter cartridge capable of removing arsenic and heavy metals including lead, mercury, cadmium, chromium, copper, nickel and thallium, pesticides, herbicides such as atrazine, and carcinogens such as dibromochloromethane, from source water to levels that are at or below the minimum levels specified by the World Health Organization and the U.S. Environmental Protection Agency. The cartridge does this using adsorptive media in the form of agglomerated nanoparticles of titanium dioxide ($TiO_2$). The $TiO_2$ may be dispersed more or less evenly throughout the entire media, or may be used to form media layers in the cartridge, including a layer of substantially only $TiO_2$, and also in other layers including the $TiO_2$ agglomerated particles interspersed with activated charcoal. Thus, source water contaminated with carcinogens, heavy metals, and other non-pathogen contaminants can be safely filtered in a gravity-feed filtration device such as residential water filter pitcher, without complex and costly filtering devices such as reverse-osmosis systems.

In one form of the present invention, a water filter cartridge includes a filter housing defining a chamber, with a filter media disposed in the chamber. The filter media includes a mixture of particles of titanium dioxide interspersed with granular activated charcoal. Source water enters the filter housing through an upper inlet opening and exits through a lower outlet opening, passing through the particles of titanium dioxide and the granular activated charcoal before exiting the lower outlet opening.

According to one aspect, the filter media includes an intermediate media layer of agglomerated nanoparticles of titanium dioxide disposed between top and bottom media layers, which each include the mixture of titanium dioxide interspersed with granular activated charcoal.

Optionally, the top media layer includes approximately 2 to 3 grams of the titanium dioxide mixed into approximately 30 to 50 grams of the granular activated charcoal, the intermediate media layer includes approximately 2 to 3 grams of the titanium dioxide, and the bottom media layer includes another approximately 2 to 3 grams of the titanium dioxide mixed into another approximately 30 to 50 grams of the granular activated charcoal.

According to another aspect, the titanium dioxide is made up of agglomerated nanoparticles having a nominal grain size of about 250-1180 microns (about 16 to 60 mesh). Optionally, the titanium dioxide is in the form of anatase titania crystal.

According to yet another aspect, the lower outlet opening is sized to limit a water flow rate through the filter media to approximately 0.3 liters per minute, and possibly higher. Optionally, the lower outlet opening has an area of about 0.03 to about 0.04 square inches, and may be divided into a plurality of separate outlet openings, such as four separate openings each having an area of about 0.007 to 0.009 square inches.

According to still another aspect, there is an upper filter pad disposed in the chamber below the upper inlet opening and above the filter media, and a lower filter pad disposed in the chamber above the lower outlet opening and below the filter media. Optionally, the upper filter pad and/or the lower filter pad are 25 to 100 micron filters.

According to another aspect, a seal is disposed around an outer periphery of the annular upper region. The seal may have a thin flange region that extends radially outwardly from the housing sidewall, and is configured to flex upwardly upon insertion of the cartridge into a filter cartridge opening of a filter support, and to form a seal when the cartridge is inserted into the filter support. Optionally, the seal includes a rounded annular region that extends radially outwardly from the sidewall and is spaced from the thin flange region. The rounded annular region may be positioned above the thin flange region, and the rounded annular region may be sized to sealingly engage the filter support at the filter cartridge opening.

According to a further aspect, the filter housing has a bottom wall in which the lower outlet opening is formed, the bottom wall including an upwardly-facing surface that defines a lower extent of the chamber, with a plurality of spaced-apart upwardly-extending projections configured to engage a lower surface of the lower filter pad and thereby support the lower filter pad above the upwardly-facing surface of the bottom wall.

According to a still further aspect, the filter housing includes a top cover defining the upper inlet opening, and defining an upper extent of the chamber.

Optionally, a seal such as an O-ring or a soft flange is disposed around an outer perimeter of the filter housing at an upper end portion thereof, with the seal configured to engage an annular surface defining a filter mount of a gravity-feed water filter pitcher.

Thus, the water filter cartridge of the present invention provides effective adsorption of non-pathogen contaminants such as arsenic and heavy metals, pesticides, and other carcinogens from source water, in a manner that results in filtered water that meets or exceeds recommendations of the World Health Organization and the U.S. Environmental Protection Agency. This is achieved in a cost-effective disposable unit that can operate in a gravity-feed pitcher or reservoir, and is thus suitable for home use, or can be scaled for larger applications depending on the desired flow rate of filtered water.

These and other objects, advantages, purposes and features of the present invention will become apparent upon review of the following specification in conjunction with the drawings.

DESCRIPTION OF THE PREFERRED EMBODIMENTS

Figures 1, 2:
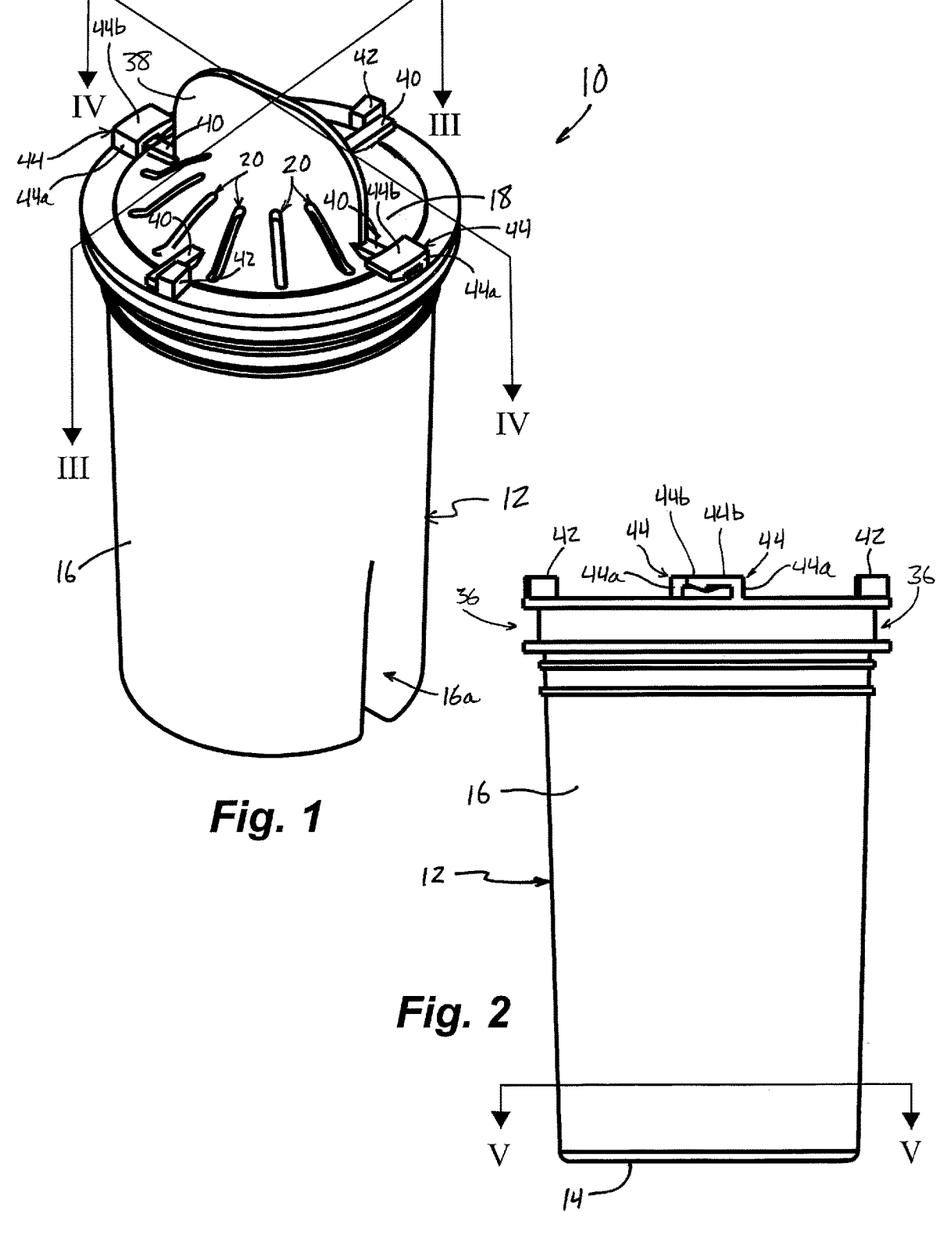
FIG. 1 is a perspective view of a water filter cartridge in accordance with the present invention.
FIG. 2 is a side elevation of the water filter cartridge of FIG. 1, shown with its cover removed.
Figure 3:
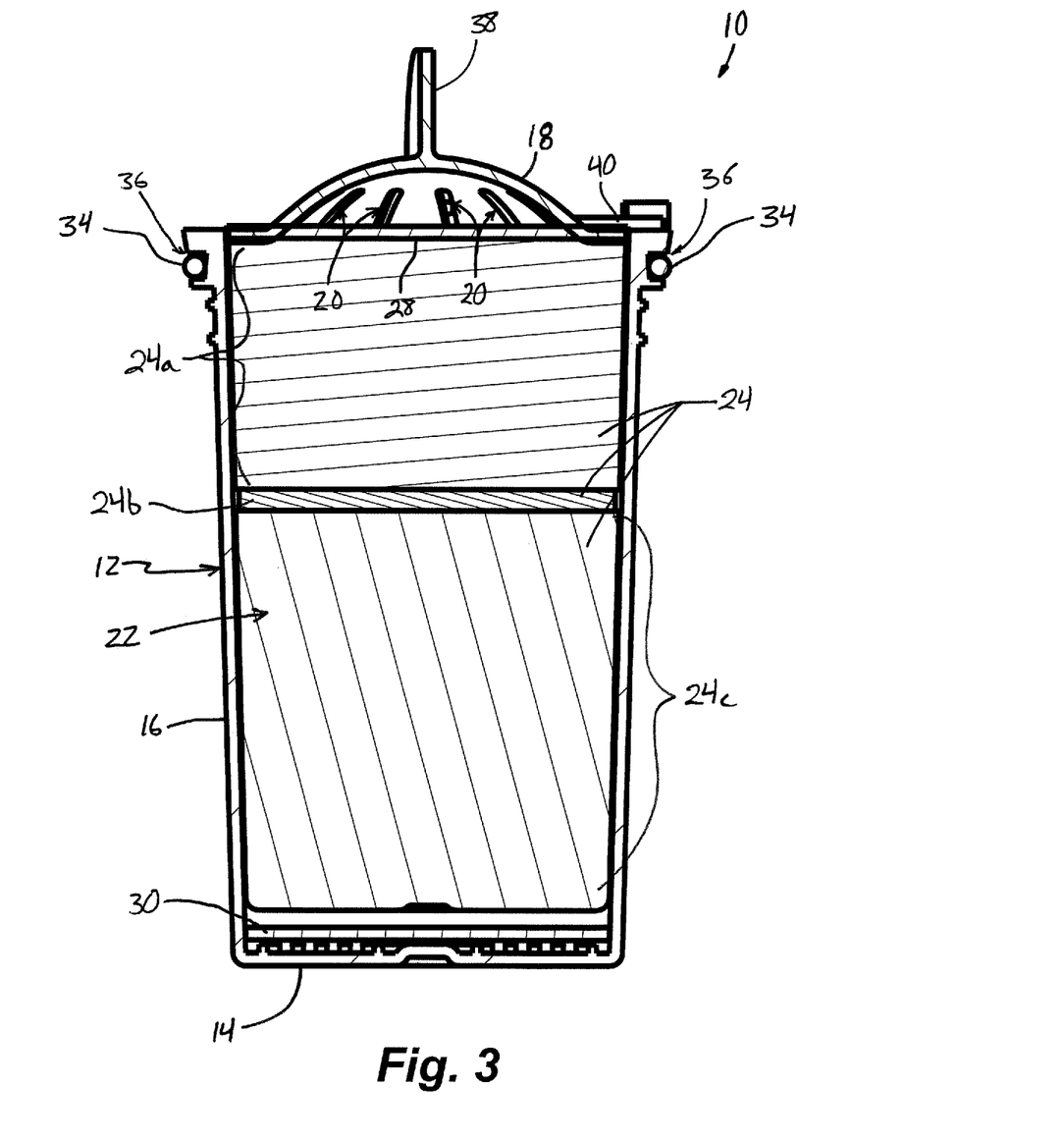
FIG. 3 is a side sectional elevation of the water filter cartridge, taken along section line III-III in FIG. 1.
Figure 4:
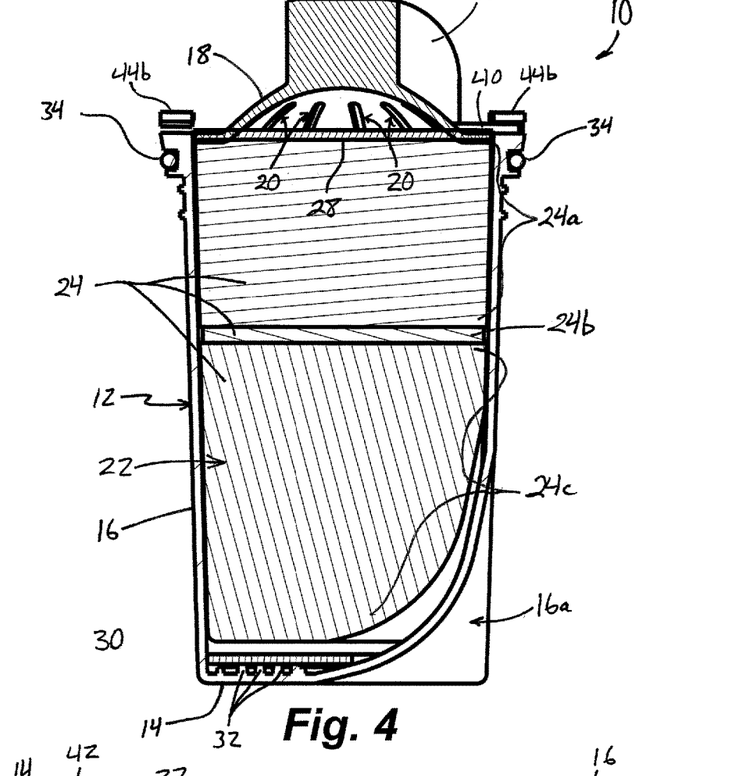
FIG. 4 is a side sectional elevation of the water filter cartridge, taken along section line IV-IV in FIG. 1.

Referring now to the drawings and the illustrative embodiments depicted therein, a water filter cartridge 10 includes a filter housing 12 with bottom wall 14 and a generally cylindrical or frusto-conical sidewall 16 extending upwardly from the bottom wall 14, with a top cover 18 fitted at an open upper end portion 16a of sidewall 16, such as shown in FIG. 1. Top cover 18 includes or defines a plurality of upper inlet openings or slots 20 through which source water enters an interior chamber 22 that is defined by housing 12, where a multi-layer filter media 24 is contained (FIGS. 3 and 4). Bottom wall 14 includes or defines a plurality of lower outlet openings 26 (FIGS. 5 and 6) through which filtered water, which has passed through filter media 24, exits the chamber 22. Filter media 24 is made up of a combination of titanium dioxide particles and granular activated charcoal, as will be described in more detail below, and is capable of removing heavy metals and a variety of pesticides and carcinogenic substances from drinking water sources ranging from municipal water supplies to private wells and cisterns, while also reducing or removing off tastes from chlorine and other additives.

In the illustrated embodiment, filter media 24 has three distinct layers, such as shown in FIGS. 3 and 4, each of which includes agglomerated nanoparticles of titanium dioxide ($TiO_2$). Suitable forms of titanium dioxide include the anatase titania crystal form, having agglomerated particle sizes of about 250 to 1180 micron (about 16-60 mesh), which is available from The Dow Chemical Company of Midland, Mich. However, it will be appreciated that other forms and particle sizes of titanium dioxide may also be selected to give satisfactory results, without departing from the spirit and scope of the present invention.

Filter media 24 includes a top or first media layer 24a made up of the aforementioned agglomerated nanoparticles of $TiO_2$ generally interspersed or mixed with granular activated charcoal, such as coconut husk charcoal, the granular activated charcoal having particle sizes of about 354 to 400 microns (about 40 to 45 mesh). An intermediate or second media layer 24b comprises a layer of substantially only the aforementioned agglomerated nanoparticles of titanium dioxide ($TiO_2$) directly below the first media layer 24a. Located directly below intermediate media layer 24b is a bottom or third media layer 24c that, like top layer 24a, is made up of the aforementioned $TiO_2$ generally interspersed or mixed with granular activated charcoal, such as coconut charcoal, the granular activated charcoal having particle sizes of about 354 to 400 microns (about 40 to 45 mesh). Thus, the composition of top media layer 24a and bottom media layer 24c may be substantially the same, with the intermediate media layer 24b of substantially only $TiO_2$ separating the top and bottom media layers.

In one embodiment sized for use in a residential or home-use water filter pitcher, interior chamber 22 has a height of approximately 3.5 inches and an average diameter of approximately 1.84 inches, to define a media volume of approximately 9.3 cubic inches. This space allows for top media layer 24a to include approximately 2 to 3 grams of the $TiO_2$ mixed or interspersed with approximately 30 to 50 grams of granular activated charcoal, for the intermediate media layer 24b to be formed from approximately 2 to 3 grams of $TiO_2$, and for the bottom media layer 24c to include approximately 2 to 3 grams of the $TiO_2$ mixed or interspersed with approximately 30 to 50 grams of granular activated charcoal. However, it will be appreciated that the size of the filter cartridge 10 and the volumes of the filter media and ratios of $TiO_2$ to activated charcoal may be scaled up or down for various applications and desired flow rates, and are not intended to be limited to the volumes, sizes, and ratios described herein.

The mixing of $TiO_2$ particles with particles of activated coconut husk charcoal in both the top and bottom media layers 24a, 24c allows the activated charcoal particles to form a three dimensional matrix or "scaffold" supporting the $TiO_2$ particles in the top and bottom media layers. This mixture in the top and bottom layers, together with intermediate media layer 24b formed substantially or entirely of $TiO_2$ particles, ensures that substantially all water molecules and contaminants contained in the source water will contact $TiO_2$ particles while passing through media 24, while further ensuring that the $TiO_2$ does not congeal to reduce the effectiveness of filtration and/or reduce the flow rate through filter 10 to unacceptable levels.

In addition to filter media 24, there is positioned inside interior chamber 22 an upper filter pad 28 above filter media 24 and below top cover 18, as shown in FIGS. 3 and 4. Located below filter media 24 and spaced above bottom wall 14 is a lower filter pad 30. Upper and lower filter pads 28, 30 may be generally disc-shaped pads made of felt or similar material, and provide particulate filtration to about 25 to 100 microns (about 120 to 550 mesh). In the illustrated embodiment, upper and lower filter pads 28, 30 are each approximately $\frac{1}{16}^{th}$ inch thick and have diameters substantially corresponding to the inner diameter of sidewall 16 near top cover 18 and bottom wall 14, respectively. Each filter pad 28, 30 prevents filter media 24 from escaping chamber 22 through inlet openings 20 or outlet openings 26. In addition, upper filter pad 28 filters particulate contaminants larger than about 25 to 100 microns from the source water entering inlet openings 20 formed in top cover 18.

Figure 5:
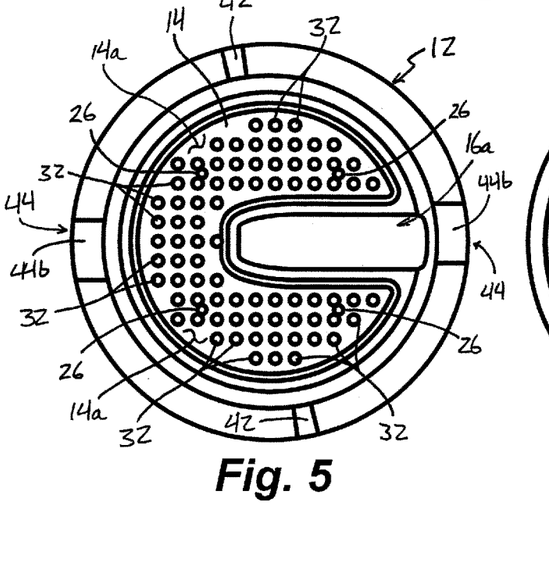
FIG. 5 is a top sectional plan view of the housing of the water filter cartridge, taken along section line V-V in FIG. 1.
Figure 6:
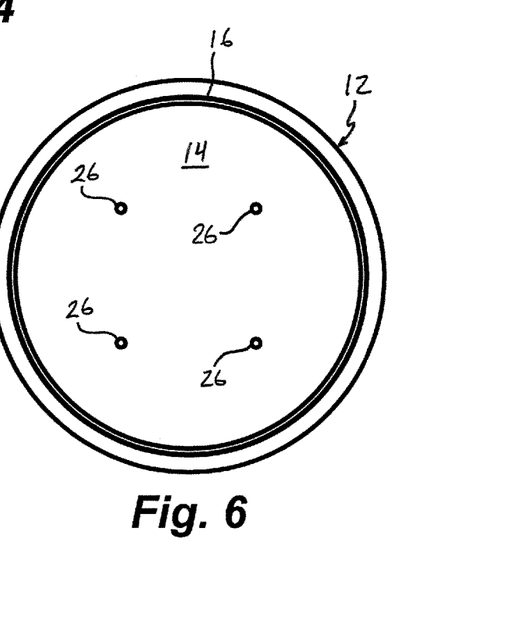
FIG. 6 is a bottom plan view of the water filter cartridge of FIG. 1.

To facilitate the flow of filtered water through lower filter pad 30 and out through lower outlet openings 26 in bottom wall 14, an array of upwardly-extending spikes or projections 32 is formed along an upwardly-facing surface 14a of bottom wall 14, as best shown in FIGS. 4 and 5. Projections 32 have tips that engage and support lower filter pad 30 from below, and provide space between lower filter pad 30 and the upwardly-facing surface 14a of bottom wall 14 for filtered water to pass to one of the lower outlet openings 26 and out into a filtered water reservoir located below or around the exterior of filter 10.

In the illustrated embodiment, there are four outlet openings 26 each having a diameter of approximately 0.052 inch and an area of about 0.007 to 0.009 square inches. Thus, in the illustrated embodiment, the combined areas of the four outlet openings total about 0.03 to 0.04 square inches of outlet opening area. The four outlet openings 26 are arranged in a square pattern (i.e., each outlet opening at the corner of the square) centered with the cartridge bottom wall 14, in which the distance between each outlet opening 26 and the two closest other outlet openings 26 is approximately ⅞ inch. However, different numbers and sizes and patterns or arrangements of outlet openings are envisioned. In typical gravity-feed residential water filter pitchers, the herein-described outlet openings 26 and filter media 24 result in a water flow rate through filter 10 of about 0.3 liters per minute, with the outlet openings 26 restricting the flow rate to that level. That is, water can pass through the above-described filter media 24 and both filter pads 28, 30 at flow rates greater than about 0.3 liters per minute if larger outlet openings are used, but when outlet openings 26 are sized as described above, the outlet openings 26 limit the flow rate and help to ensure that substantially all water molecules and contaminants contact the agglomerated particles of $TiO_2$ in one or more of the filter media layers 24a-c.

Other features of water filter cartridge 10 include a sealing O-ring 34 that is received in an annular notch 36 that faces radially outwardly and is formed in an outer surface of housing sidewall 16 near an upper end thereof (FIGS. 2-4). O-ring 34 provides an enhanced water-tight seal between the filter housing sidewall 16 and a circular opening formed at the bottom of a source water reservoir in a water filter pitcher or other filtering device, and helps to ensure that unfiltered source water will not enter the filtered water reservoir or discharge area. In addition, a notch 16a formed in filter housing sidewall 16 provides clearance for certain types of residential gravity-feed water filter pitchers, to facilitate use of cartridge 10 as a substantially universal replacement cartridge for many different types of water filter pitchers.

Top cover 18 includes an upwardly-extending gripping tab 38 that facilitates holding the water filter cartridge 10 during insertion into a water filter pitcher, and facilitates gripping and removing the water filter cartridge 10 from a water filter pitcher, including disengaging the O-ring 34 (or other sealing feature) that provides an enhanced seal. Top cover 18 further includes four radially outwardly-extending arms 40, as shown in FIGS. 1, 3 and 4, which are used to secure top cover 18 to the open upper end defined by cartridge sidewall 16. In the illustrated embodiment, arms 40 are arranged at 90 degrees and 180 degrees relative to one another, and engage respective blocking projections 42 and blocking-latching projections 44 formed at the top of cartridge sidewall 16. Blocking projections 42 are positioned opposite one another and are engaged by two of the arms 40 upon counterclockwise rotation (viewed from above) of top cover 18 relative to cartridge sidewall 16. Blocking-latching projections 44 include upwardly-extending portions 44a that are engaged by the two other arms 40 upon counterclockwise rotation of top cover 18 relative to cartridge sidewall 16, and further include circumferentially-extending legs 44b that project laterally from upper ends of the upwardly-extending portions 44a. The circumferentially-extending legs 44b cover portions of the arms 40 that rotate into engagement with the upwardly-extending portions 44a.

Optionally, and as shown in FIGS. 1-4, the blocking-latching projections 44 are made of resilient material and the circumferentially-extending legs 44b include latching features that resist clockwise rotation of top cover 18 once legs 40 fully engage the circumferentially-extending legs 44b. This engagement permits top cover 18 to be initially mechanically secured to the filter housing sidewall 16 after chamber 22 is filled with filter media 24 and filter pads 28, 30. Although it may be sufficient to mechanically secure top cover 18 in this manner alone, it is further envisioned that top cover 18 may be further secured, such as permanently, via ultrasonic welding or other techniques, so that cartridge housing 12 may not be disassembled by removing top cover 18 from the open upper end of the cartridge sidewall 16. Cartridge housing 12, including bottom wall 14, projections 32, sidewall 16, and top cover 18, may all be made from molded resinous plastic or substantially any other suitable material that is suitable for use in direct contact with drinking water.

During assembly, top cover 18 may apply a compressive force to upper filter pad 28, which results in a compressive force applied to filter media 24 and lower filter pad 30, and prevents or limits the filter media layers 24a-c from mixing with one another during transportation, handling, and use. In this way, filter media layers 24a-c are maintained as substantially discrete layers, even if no porous membrane or screen is positioned between adjacent layers. However, it will be appreciated that, if desired, a porous membrane or filter pad or screen may between the upper media layer 24a and intermediate media layer 24b, and between the intermediate media layer 24b and the lower media layer 24c, without departing from the spirit and scope of the present invention. In addition, although a three-layer filter media is primarily described herein, it will be appreciated that additional layers, or different arrangements or ordering or dimensioning of layers, or different ratios of the constituents of each filter media layer, may be selected to provide desired filtration and flow rates.

The following is an example of the filtration performance provided by gravity-feed water filter cartridges configured as described above. Contaminated source water was provided, having arsenic at 50 parts per billion (ppb), lead at 150 ppb, mercury at 15 ppb, cadmium at 15 ppb, and chromium at 15 ppb. The filtered water exiting the water filter cartridges contained less than 4 ppb arsenic (EPA limit 10 ppb), less than 3 ppb lead (EPA limit 15 ppb), less than 0.2 ppb mercury (EPA limit 2 ppb), less than 4 ppb cadmium (EPA limit 5 ppb), and less than 10 ppb chromium (EPA limit 100 ppb).

Although the layered media of water filter cartridge 10 has been found to provide good performance, it may be possible to achieve similar performance using a non-layered filter media, such as with a substantially homogenous media 124 of an alternative water filter cartridge 110 (FIGS. 7-11). Because of the non-layered media 124, a simplified top cover arrangement, and a molded-on seal, the production costs of the alternative cartridge 110 may be reduced as compared to the cartridge 10 of FIGS. 1-6. In many respects this alternative water filter cartridge 110 is similar or nearly identical to the water filter cartridge 10 described above, such that the following discussion of the alternative cartridge 110 will focus primarily on the differences between the cartridges. It will be appreciated that various regions and components of cartridge 110 that are substantially similar to regions and components of cartridge 10 are given like numerals by the addition of 100, such that the regions and components may be generally understood with reference to the above discussion.

Figure 7:
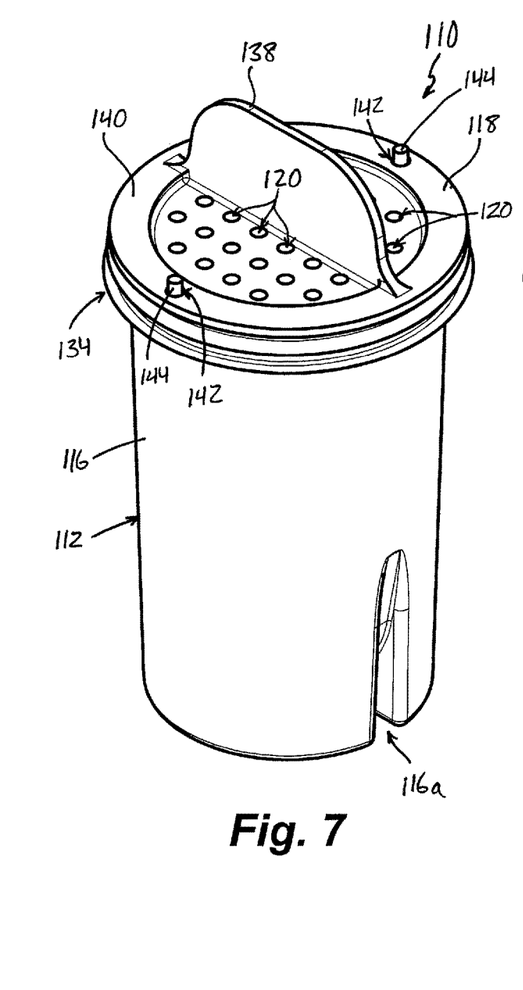
FIG. 7 is a perspective view of another water filter cartridge in accordance with the present invention.
Figure 8:
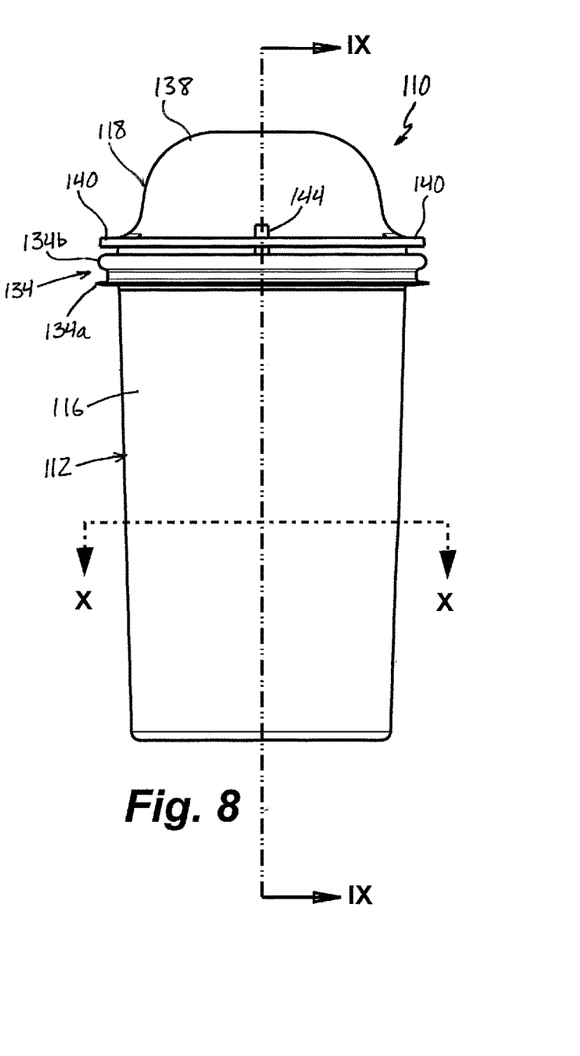
FIG. 8 is a side elevation of the water filter cartridge of FIG. 7.
Figure 9:
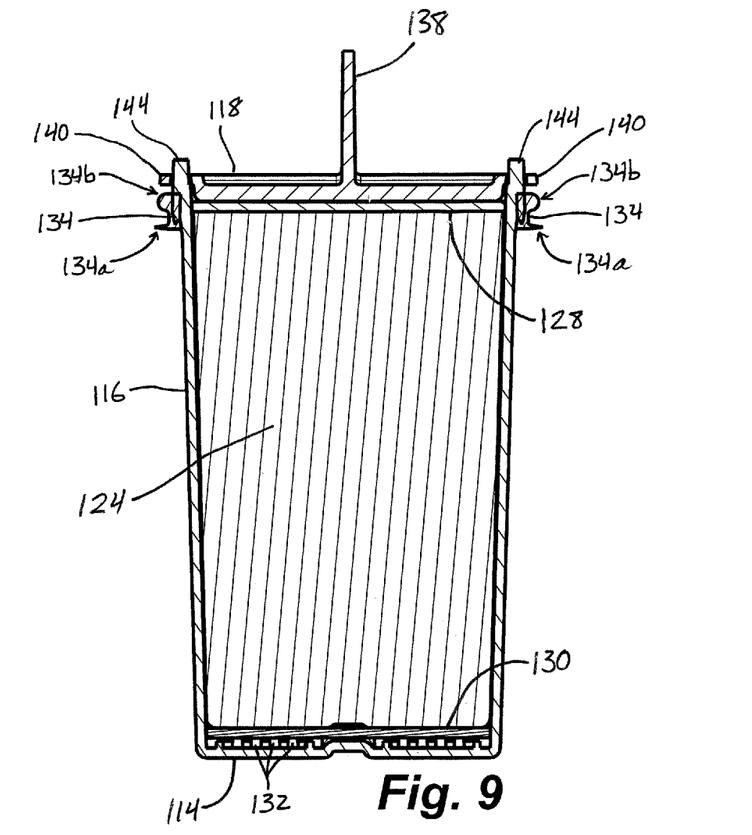
FIG. 9 is a side sectional elevation of the water filter cartridge, taken along section line IX-IX in FIG. 7.
Figure 10:
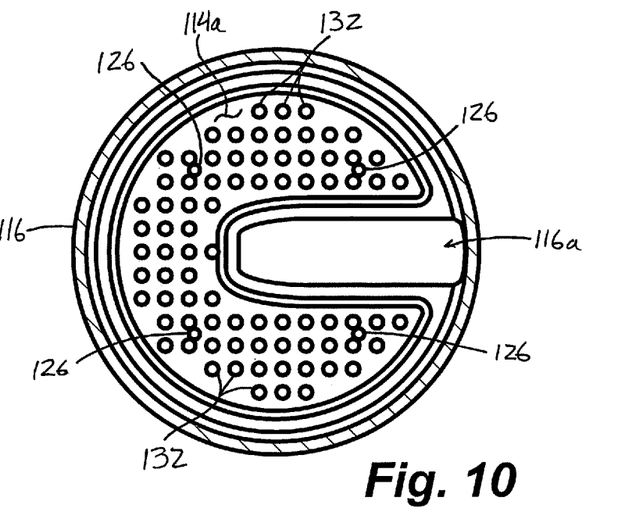
FIG. 10 is a top sectional plan view of the housing of the water filter cartridge, taken along section line X-X in FIG. 7.
Figure 11:
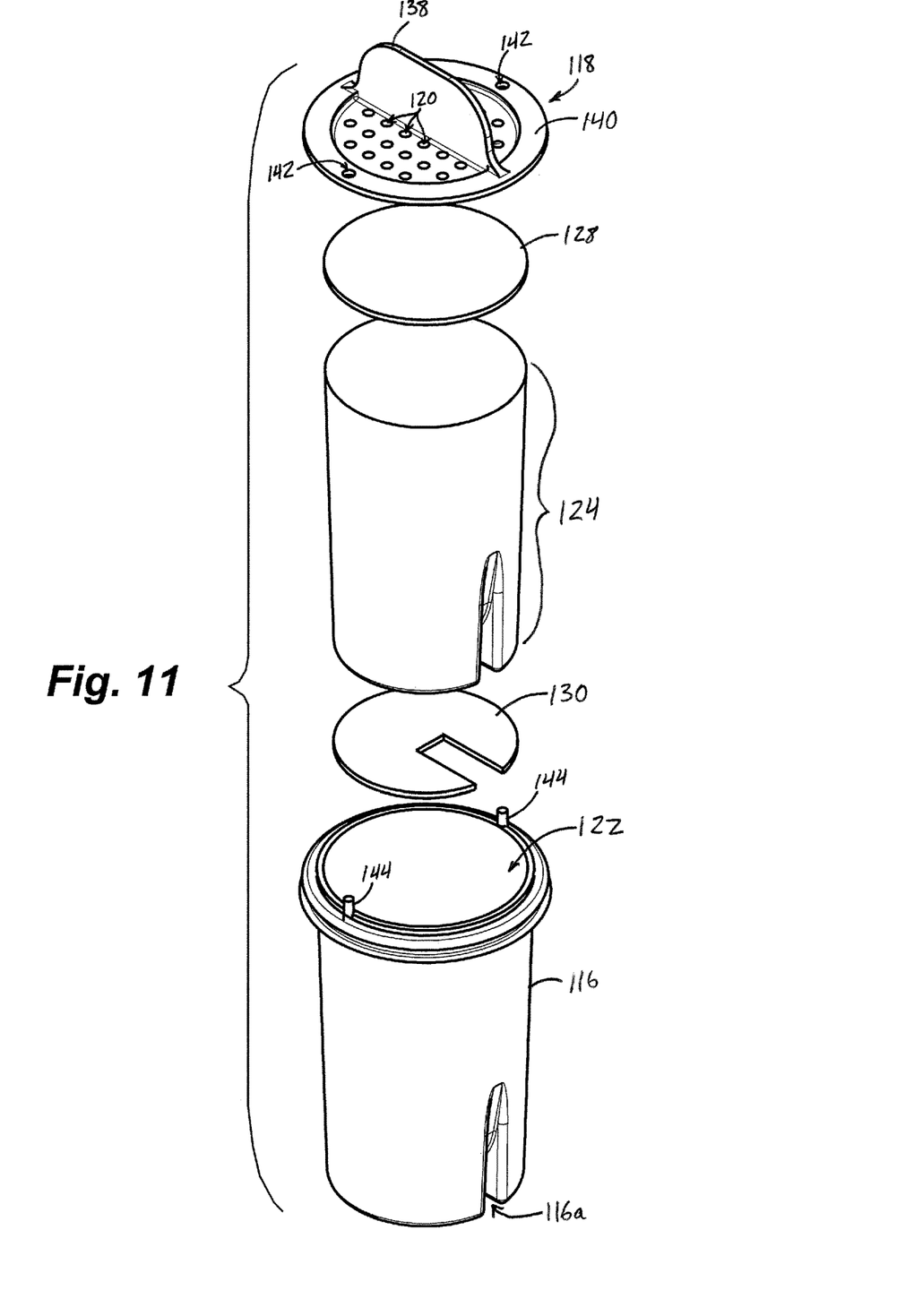
FIG. 11 is an exploded perspective view of the water filter cartridge of FIG. 7.

The homogenous media cartridge 110 includes a filter housing 112 that is substantially similar to the housing 12 described above, but with a different mating interface for the top cover 118 to the filter housing sidewall 116, and with a sealing member in the form of an integral flange seal 134 instead of the separate O-ring 34 of cartridge 10. Top cover 118 has a generally flat annular rim 140 with a pair of holes 142 formed at opposite sides thereof, such as shown in FIGS. 7, 9 and 11. Holes 142 receive respective pins 144 that project upwardly from an upper rim of the filter housing sidewall 116, such as shown in FIG. 11. Once the top cover 118 is assembled to the sidewall 116 as shown in FIGS. 7-9, the upper ends of the pins 114 may be expanded by a swaging or heat-staking operation, causing the pins' upper ends to expand so that they cannot be pulled back through the holes 142. Optionally, the entire annular lower surface of the top cover's annular rim 140 can be ultrasonically sealed or secured in any suitable manner to the upper rim of the filter housing sidewall 116.

Top cover 118 includes an upwardly-extending gripping tab 138 and a pattern of source water entry holes 120 that, in one exemplary embodiment, may be sized at about 0.052 inches in diameter. The top cover 118 further includes the annular sealing member or seal 134 at its outer perimeter. The seal 134 can be made from any natural or synthetic rubber or rubber-like material that is suited and approved for extended contact with potable water and dissolved substances and solids that are commonly found in source water used to generate potable water. Seal 134 may be molded directly onto the outer perimeter surface of the filter housing sidewall 116, just below its upper rim, such as shown in FIGS. 9 and 11. Optionally, the seal 134 may be formed as a separate member, and stretched around the upper rim of the sidewall 116 in a separate assembly step.

Seal 134 includes a thin flange region 134a that flexes upwardly upon insertion of the cartridge 110 into a filter cartridge opening at the bottom of a source water reservoir of a gravity-feed water filtering pitcher, and establishes a water-resistant or water-tight seal with the surface defining the filter cartridge opening in the pitcher. The thin flange region 134a may account for (or extend along) only about 5% to 25% of the overall height of the seal 134, and may be sufficiently thin to be membrane-like, while remaining sufficiently resilient to return to its relaxed radially-outwardly extended state, as shown in the drawings, after it is no longer compressed inwardly when installed in a filter pitcher or other filter support. Seal 134 further includes a taller and rounded annular upper region 134b spaced above the thin flange region 134a, and may provide or establish a separate sealing interface above the sealing interface provided by the thin flange region 134a. Because of the distance by which the thin flange region 134a extends radially outwardly from the filter housing sidewall 116, along with the significant flexibility of the seal material particularly in the flange region 134a, the seal 134 may be better suited than a traditional O-ring at accommodating imperfections in the shapes of the filter housing sidewall 116 and/or the surface defining the filter cartridge opening in the pitcher (e.g., out-of-round conditions, localized ridges, flashing, etc.). In this way, contaminated source water above the cartridge 110 is substantially or entirely precluded from leaking into the clean water reservoir below the cartridge.

Referring to FIGS. 9 and 11, filter media 124 is a non-layered mixture including agglomerated nanoparticles of titanium dioxide ($TiO_2$) are evenly interspersed with refined coconut charcoal, without any distinguishable layers or regions that are significantly higher in concentration of $TiO_2$ or of coconut charcoal. Although it is possible and anticipated that the $TiO_2$ will not be perfectly evenly intermixed with coconut charcoal particles in filter media 124, an even dispersal of $TiO_2$ is generally the objective of a pre-mixing step prior to filling of the filter housing 112 with the media 124, such that the $TiO_2$ particles can be considered substantially evenly interspersed with the coconut charcoal particles inside the housing 112, even if there are some variations to the concentration of $TiO_2$ particles throughout the media. The particle sizes of $TiO_2$ and coconut charcoal in media 124 may be the same or similar to the particle sizes described above with reference to the layered media of cartridge 10. It should be appreciated that in the exploded view of FIG. 11, media 124 is depicted as a solid mass that, owing to its makeup as a mixture of particles, has assumed the shape of the interior chamber 122 as defined by interior surfaces of the housing 112. Filter media 124 may include at least 6 grams of agglomerated nanoparticles of anatase titania crystal titanium dioxide, and optionally about 15 to 20 grams of the titanium dioxide. Filter media 124 may further include about 55 grams of carbon, such as in the form of coconut charcoal particles as noted above. This combination yields a total media weight of about 70 to 75 grams of titanium dioxide interspersed with carbon.

Accordingly, the present invention provides a water filter cartridge that is sufficiently low in cost to be suitable for home use, and requires only source water at gravity-feed pressure, while provided effective filtration of contaminants such as arsenic and heavy metals, pesticides, and other carcinogens. This is achieved in a cost-effective disposable unit that can operate in a gravity-feed pitcher or reservoir, and is thus suitable for home use, or can be scaled for larger applications depending on the desired flow rate of filtered water. Further, although gravity-feed pitchers are envisioned as a cost effective means of providing sufficient drinking water for a family or other small group of people, it will be appreciated that the principles of the present invention may be adapted for use in pressurized water systems, in higher-volume systems, and in other, more complex filtration systems or arrangements.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A disposable water filter cartridge for use in a residential gravity-feed pitcher, said water filter cartridge comprising:
    a filter housing defining a chamber having an upper inlet opening and at least one lower outlet opening having a combined total area of about 0.03 to 0.04 square inches; and
    a filter media disposed in said chamber, said filter media comprising a granular mixture of at least 6 grams of agglomerated nanoparticles of anatase titania crystal titanium dioxide interspersed with less than or equal to 100 grams of granular activated charcoal;

wherein said at least one lower outlet opening is sized to limit a flow rate through said filter media to at least about 0.3 liters per minute at gravity-feed pressure in the residential gravity-feed water filter pitcher.

2. The water filter cartridge of claim 1, wherein said agglomerated nanoparticles of anatase titania crystal titanium dioxide are substantially evenly distributed with said granular activated charcoal.

3. The water filter cartridge of claim 1, wherein said filter media comprises approximately 15 to 20 grams of said agglomerated nanoparticles of anatase titania crystal titanium dioxide and approximately 55 grams of said granular activated charcoal.

4. The water filter cartridge of claim 1, wherein said agglomerated nanoparticles of anatase titania crystal titanium dioxide have a nominal grain size of about 16 to 60 mesh, and said granular activated charcoal have a nominal grain size of about 40 to 45 mesh.

5. The water filter cartridge of claim 1, wherein said filter housing comprises a sidewall having an annular upper region and a seal disposed around an outer periphery of said annular upper region.

6. The water filter cartridge of claim 5, wherein said seal comprises a thin flange region that extends radially outwardly from said sidewall and is configured to flex upwardly upon insertion of the sidewall into a filter cartridge opening of a filter support, and to sealingly engage the filter support at the filter cartridge opening.

7. The water filter cartridge of claim 6, wherein said seal comprises a rounded annular region that extends radially outwardly from said sidewall and is spaced from said thin flange region.

8. The water filter cartridge of claim 7, wherein said rounded annular region is positioned above said thin flange region, and wherein said rounded annular region is configured to sealingly engage the filter support at the filter cartridge opening.

9. The water filter cartridge of claim 1, further comprising an upper filter pad disposed in said chamber below said upper inlet opening and above said filter media, and a lower filter pad disposed in said chamber above said at least one lower outlet opening and below said filter media.

10. The water filter cartridge of claim 9, wherein said filter housing comprises a bottom wall in which said at least one lower outlet opening is formed, said bottom wall comprising an upwardly-facing surface that defines a lower extent of said chamber, and said bottom wall further comprising an array of spaced-apart upwardly-extending spikes having respective upper tips configured to engage a lower surface of said lower filter pad and support said lower filter pad above said upwardly-facing surface.

11. The water filter cartridge of claim 1, wherein said filter media comprises separate top and bottom media layers of said granular mixture of agglomerated nanoparticles of anatase titania crystal titanium dioxide interspersed with granular activated charcoal, and an intermediate media layer of agglomerated nanoparticles of anatase titania crystal titanium dioxide disposed between said top and bottom media layers.

12. The water filter cartridge of claim 11, wherein said top media layer comprises approximately 30 to 50 grams of said granular activated charcoal and approximately 2 to 3 grams of said nanoparticles of anatase titania crystal titanium dioxide, said bottom media layer comprises approximately 30 to 50 grams of said granular activated charcoal and approximately 2 to 3 grams of said nanoparticles of anatase titania crystal titanium dioxide, and said intermediate media layer consists of approximately 2 to 3 grams of said nanoparticles of anatase titania crystal titanium dioxide.

13. The water filter cartridge of claim 1, wherein said granular activated charcoal comprises coconut charcoal.

14. A disposable water filter cartridge for use in a residential gravity-feed pitcher, said water filter cartridge comprising:

a filter housing configured for use in the residential gravity-feed pitcher, said filter housing comprising a sidewall having an annular upper region and said filter housing defining a chamber having an upper inlet opening and a lower outlet opening formed in a bottom wall, wherein said lower outlet opening comprises a plurality of spaced-apart lower outlet openings having a combined total area of about 0.03 to 0.04 square inches;

a filter media disposed in said chamber, said filter media comprising a granular mixture of at least 6 grams of agglomerated nanoparticles of anatase titania crystal titanium dioxide interspersed with less than or equal to 100 grams of granular activated charcoal;

a seal disposed around an outer periphery of said annular upper region, said seal comprising a flange region that extends radially outwardly from said sidewall and configured to flex upwardly upon insertion of the sidewall into a filter cartridge opening of a filter support;

an upper filter pad disposed in said chamber below said upper inlet opening and above said filter media; and a lower filter pad disposed in said chamber above said lower outlet opening and below said filter media;

wherein said bottom wall comprises an upwardly-facing surface that defines a lower extent of said chamber, and an array of spaced-apart upwardly-extending spikes having respective upper tips configured to engage a lower surface of said lower filter pad and support said lower filter pad above said upwardly-facing surface; and wherein said lower outlet opening is sized to limit a flow rate through said filter media to at least about 0.3 liters per minute.

15. The water filter cartridge of claim 14, wherein said seal comprises a rounded annular region that extends radially outwardly from said sidewall and is spaced from said flange region.

16. The water filter cartridge of claim 15, wherein said rounded annular region is positioned above said flange region, and wherein said rounded annular region is configured to sealingly engage the filter support at the filter cartridge opening.

17. The water filter cartridge of claim 14, wherein said granular activated charcoal comprises coconut charcoal having a nominal grain size of about 40 to 45 mesh, and wherein said agglomerated nanoparticles of anatase titania crystal titanium dioxide have a nominal grain size of about 16 to 60 mesh.

18. The water filer cartridge of claim 14, wherein said filter media comprises approximately 15 to 20 grams of said agglomerated nanoparticles of anatase titania crystal titanium dioxide and approximately 55 grams of said granular activated charcoal.

19. The water filter cartridge of claim 14, wherein said agglomerated nanoparticles of anatase titania crystal titanium dioxide are substantially evenly distributed with said granular activated charcoal.

20. The water filter cartridge of claim 14, wherein said filter media comprises separate top and bottom media layers of said granular mixture of agglomerated nanoparticles of anatase titania crystal titanium dioxide interspersed with granular activated charcoal, and an intermediate media layer of agglomerated nanoparticles of anatase titania crystal titanium dioxide disposed between said top and bottom media layers.

\* \* \* \* \*

UNITED STATES PATENT AND TRADEMARK OFFICE
CERTIFICATE OF CORRECTION

| | |
|---|---|
| PATENT NO. | : 11,713,255 B2 |
| APPLICATION NO. | : 17/365467 |
| DATED | : August 1, 2023 |
| INVENTOR(S) | : Harry Joseph Knopke et al. |

It is certified that error appears in the above-identified patent and that said Letters Patent is hereby corrected as shown below:

In the Claims

Column 9
Lines 5 and 6, Claim 1, "in the residential gravity-feed water filter pitcher" should be --through said water filter cartridge--

Signed and Sealed this
Twenty-ninth Day of August, 2023

*Katherine Kelly Vidal*

Katherine Kelly Vidal
*Director of the United States Patent and Trademark Office*